United States Patent
Ranganath

(10) Patent No.: US 7,734,189 B2
(45) Date of Patent: *Jun. 8, 2010

(54) PARALLEL CHANNEL OPTICAL COMMUNICATION USING MODULATOR ARRAY AND SHARED LASER

(75) Inventor: Tirumala R. Ranganath, Palo Alto, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 601 days.

This patent is subject to a terminal disclaimer.

(21) Appl. No.: 11/607,236

(22) Filed: Nov. 30, 2006

(65) Prior Publication Data

US 2008/0131141 A1    Jun. 5, 2008

(51) Int. Cl.
  *H04B 10/04* (2006.01)
(52) U.S. Cl. .................. 398/182; 398/201; 398/183; 372/26; 372/29.01; 359/254
(58) Field of Classification Search ............ 398/66–76, 398/182–201; 372/26, 29, 29.016, 50; 359/245–349; 356/502
  See application file for complete search history.

(56) References Cited

U.S. PATENT DOCUMENTS

| | | | |
|---|---|---|---|
| 4,953,935 A * | 9/1990 | Suchoski et al. ............ 385/46 |
| 5,040,863 A | 8/1991 | Kawakami et al. | |
| 5,463,705 A | 10/1995 | Clauberg et al. | |
| 5,608,565 A * | 3/1997 | Suzuki et al. .............. 359/237 |
| 5,631,758 A | 5/1997 | Knox et al. | |
| 5,663,822 A | 9/1997 | Fee | |
| 5,663,824 A | 9/1997 | Koch et al. | |
| 5,912,749 A * | 6/1999 | Harstead et al. ............. 398/75 |
| 6,141,127 A | 10/2000 | Boivin et al. | |
| 6,163,395 A | 12/2000 | Nemecek et al. | |
| 6,275,317 B1 | 8/2001 | Doerr et al. | |
| 6,282,005 B1 * | 8/2001 | Thompson et al. .......... 398/143 |
| 6,388,782 B1 | 5/2002 | Stephens et al. | |
| 6,597,718 B2 | 7/2003 | Tanbun-Ek et al. | |
| 6,747,776 B2 | 6/2004 | Fujii et al. | |
| 6,819,478 B1 * | 11/2004 | Islam ........................ 359/334 |
| 6,842,587 B1 | 1/2005 | McGhan et al. | |
| 6,917,764 B1 * | 7/2005 | Wilson ....................... 398/193 |
| 7,058,098 B1 * | 6/2006 | Shay ..................... 372/29.016 |

(Continued)

FOREIGN PATENT DOCUMENTS

JP        04-099081        * 3/1992

OTHER PUBLICATIONS

Weinmann et al: "Polarization-Independent nd Ultra-High Bandwidth Electroabsorption Modulator in Multiquantum-Well Deep-Ridge Waveguide Technology", IEEE Photonics Technology Letters, vol. 8, No. 7, Jul. 1996, pp. 891-893.*

*Primary Examiner*—Li Liu
*Assistant Examiner*—Kenneth N Vanderpuye

(57) ABSTRACT

An optical transmitter includes a drive laser, a 1×N splitter, and an array of modulators. The 1×N splitter is coupled to split a beam from the drive laser into separated beams, and the modulators modulate the respective beam to represent respective data signals that are transmitted in parallel. Embodiments of the transmitter can provide high data rate communications at low cost by eliminating the need for an array of isolators and eliminating the need for high quality AR coatings. Additionally, an integrated optical circuit containing the modulator array does not require an array of lasers and can be fabricated at higher yields and lower costs.

11 Claims, 2 Drawing Sheets

U.S. PATENT DOCUMENTS

| | | |
|---|---|---|
| 7,065,300 B1 | 6/2006 | Walker |
| 7,224,519 B2 | 5/2007 | Shin et al. |
| 7,233,433 B1 * | 6/2007 | Shay .......................... 359/349 |
| 7,292,791 B2 | 11/2007 | Sayyah et al. |
| 7,315,557 B2 | 1/2008 | Futami et al. |
| 2001/0026565 A1 | 10/2001 | Takeshita et al. |
| 2003/0030888 A1 | 2/2003 | Sakai et al. |
| 2003/0165173 A1 * | 9/2003 | Helbing et al. ................ 372/50 |
| 2004/0032646 A1 * | 2/2004 | Koren et al. ................. 359/344 |
| 2004/0213574 A1 | 10/2004 | Han et al. |
| 2005/0018732 A1 | 1/2005 | Bond et al. |
| 2005/0244994 A1 * | 11/2005 | Meliga et al. ................. 438/22 |
| 2005/0276615 A1 | 12/2005 | Ranganath |
| 2006/0051103 A1 | 3/2006 | Ranganath |
| 2006/0215175 A1 * | 9/2006 | Yacoubian .................. 356/502 |
| 2008/0131141 A1 | 6/2008 | Ranganath |
| 2008/0219304 A1 | 9/2008 | Kupershmidt et al. |

* cited by examiner

PARALLEL CHANNEL OPTICAL COMMUNICATION USING MODULATOR ARRAY AND SHARED LASER

BACKGROUND

Some optical communication systems use multiple channels on parallel optical fibers for high bandwidth communications over relatively long distances, e.g., hundreds of meters to several km. A transmitter for such a system can include an optical integrated circuit having one Distributed Feedback (DFB) laser and one Electro-Absorption (EA) modulator per optical signal. In operation, the EA modulators modulate the output beams from respective DFB lasers as needed to represent transmitted data. This EA-DFB configuration, which performs modulation outside the DFB laser, can achieve data rates of 20 Gb/s and higher per optical signal. However, optical integrated circuits containing arrays of DFB laser/EA modulator pairs are complex and difficult to fabricate. As a result, the fabrication process for these systems generally has a low yield of functional integrated circuits.

These communication systems also have a general need to limit or eliminate the downstream reflections returning to the DFB lasers because such reflections can lead to instability in the optical signals output from the DFB lasers, potentially causing transmission errors. As a result, an array of optical isolators may be needed to adequately prevent down-the-line reflections from feeding back into the DFB lasers. Individual optical isolators for each laser increase system cost. Additionally, the output facets of the modulators in the integrated structure may require costly high quality anti-reflective (AR) coatings, e.g., a coating with a reflectivity less than about $10^{-4}$ to reduce reflections back into the DFB lasers.

A transmitter or other integrated circuit containing an EA-DFB array also requires drive circuits for the EA-DFB pairs of the array, and the drive currents for these devices significantly contribute to the complexity, power budget, and heating of the integrated circuit. Maintaining adequate DFB performance generally requires that the device temperature be controlled over a relatively small window. In addition, the EA modulators may also provide less than optimal performance at the extremes of the operating temperature of a high power IC. As a result, thermoelectric (TE) coolers, which are relatively inefficient devices that consume additional electrical power, may be needed.

The difficulties in fabricating and operating multiple-channel transmitters for long-distance, high-bandwidth communications make such systems expensive. Alternative high-bandwidth optical communications systems that can be produced in higher yield processes and provide high bandwidth communications over relatively long reaches and at low cost are thus sought.

SUMMARY

In accordance with an aspect of the invention, a parallel architecture for optical communications uses an array of modulators such as EA modulators but is fed by a single drive laser such as a high power DFB laser. A 1×N splitter can split a beam output from the drive laser into separate input beams for the modulators in the array. This architecture allows use of highly reliable EA modulator arrays that can be fabricated with higher yields than normally achieved for an EA-DFB array. Further, just one optical isolator for the laser can be employed to lower system cost relative to systems requiring an array of optical isolators. System cost advantages also arise because the single optical isolator, which effectively protects the laser from downstream reflections, makes a very high quality AR coating unnecessary on the EA modulator array. Using an array of polarization independent EA modulators further allows the freedom to package the source DFB laser in a separate package, and the DFB laser in turn may be connected to a splitter using a single-mode optical fiber pigtail without requiring a polarization-preserving optical fiber and without penalty for this freedom.

One specific embodiment of the invention is an optical transmitter that includes a drive laser, a 1×N splitter, and an array of modulators. The 1×N splitter is used to split a beam from the drive laser into separated beams. The modulators are preferably EA modulators that modulate the respective beams to represent respective data signals that are transmitted in parallel. The drive laser can include an optical isolator, so that separate isolators for the respective parallel data channels are not required.

Another specific embodiment of the invention is a data transmission method. The data transmission method includes: directing a first beam into a 1×N splitter that splits the first beam and produces a plurality of separated beams; and modulating the separated beams to represent respective data streams that are transmitted in parallel.

BRIEF DESCRIPTION OF THE DRAWINGS

Use of the same reference symbols in different figures indicates similar or identical items.

DETAILED DESCRIPTION

In accordance with an aspect of the invention, a parallel channel optical transmitter for high bandwidth communications can employ a single optically isolated drive laser that is separate from an optical integrated circuit containing an array of high speed modulators, thus reducing power dissipation and complexity of the optical integrated circuit. This architecture is easy to build and in particular permits use of reliable EA modulator arrays that can be fabricated at higher yield and lower cost than systems having an array of drive lasers in an optical integrated circuit. Complexity and cost are further reduced because an array of optical isolators, which may otherwise be needed for a laser array, for example, can be replaced with a single optical isolator for the single drive laser.

Figure 1:
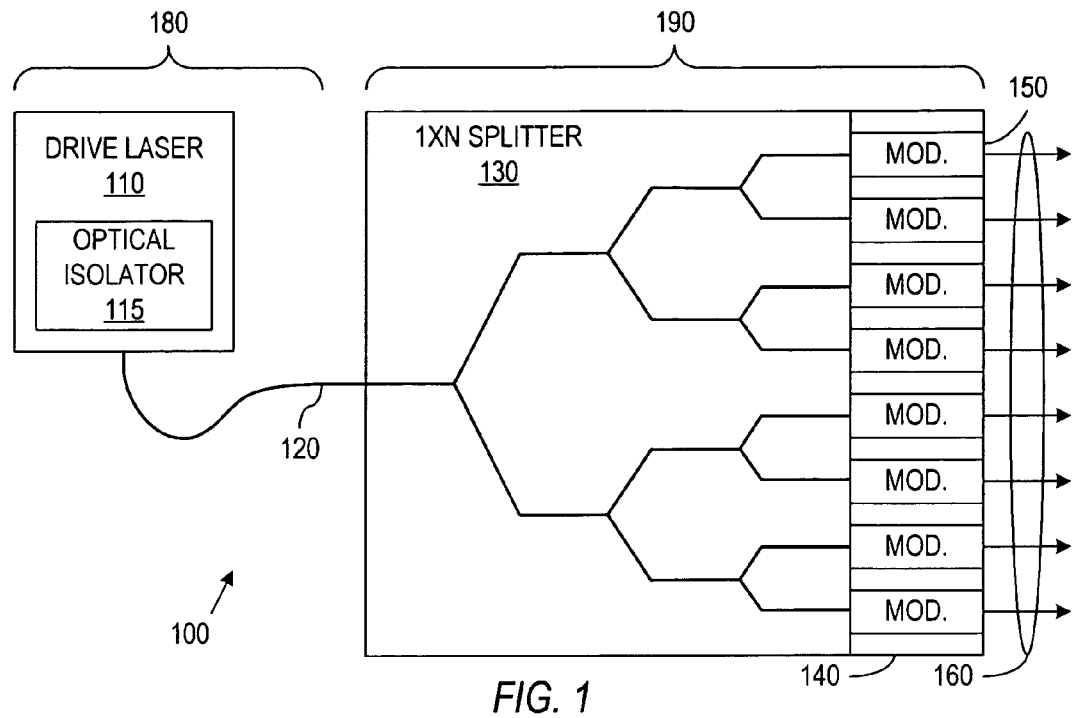
FIG. 1 illustrates a transmitter for optical communications in accordance with an embodiment of the invention using a shared drive laser, a splitter, and a modulator array.

FIG. 1 shows a transmitter 100 in accordance with an embodiment of the invention including a drive laser 110 that is coupled through an optical fiber 120 to a 1×N beam splitter 130. Beam splitter 130 in turn feeds multiple beams into optical inputs of an optical integrated circuit 140 containing an array of modulators 150 that respectively control optical signals transmitted on optical channels 160. In an exemplary implementation of transmitter 100, drive laser 110 can be in one package, e.g., in a laser subunit 180, having optical fiber 120 as a fiber pigtail, and 1×N splitter 130 and integrated circuit 140 can be hybrid integrated in a separate package, e.g., as a modulator subunit 190, having a pigtail connection (not shown). To deploy the exemplary embodiment of transmitter 100, a user could connect laser subunit 180 to modulator subunit 190 by means of the respective fiber pigtails.

In an exemplary embodiment of the invention, drive laser 110 is a high power DFB laser with a built-in optical isolator 115. More generally, high data rate transmission, e.g., transmissions of 40 Gb/s per channel 160, over several kilometers requires a narrow frequency spectrum such as provided by a DFB laser. Suitable DFB lasers having power between 10 mw and 50 mw are commercially available from a variety of sources including Mitsubishi Electric Corporation or Furukawa Electric Co., Ltd. In general, the required power of drive laser 110 will depend on the number of optical communication channels 160, the transmission distance, and the sensitivity of the receiver (not shown) at the opposite ends of optical channels 160. However, for a typical configuration having eight communication channels, a DFB laser with a power of about 20 mW would be able to drive eight 40-Gb/s channels over distances of several km.

In the embodiment of FIG. 1, drive laser 110 connects to 1×N beam splitter 130 through optical fiber pigtail 120. This interconnection has advantages in that laser 110 is a separate unit and can be selected according to the target communication distance of transmitter 100. Further, laser 110 can be easily removed and replaced in the event of a component failure or a change in the required parameters of transmitter 100, e.g., drive laser 110 can be replaced with a higher power laser to increase the number of parallel channels and/or the range of optical communications. Further, laser 110 can be selected or altered to provide the desired frequency or wavelength of light used in optical communication channels 160.

Use of a drive laser 110 that has a characteristic wavelength in the 1300 nm window offers particular advantages. In particular, standard single mode fibers go through the zero dispersion point around 1310 nm. This means that material dispersion in a standard single mode fiber is not a serious issue for 1310-nm light, and with a DFB source having a single mode corresponding to 1310 nm, the link length for optical channels 160 is limited primarily by the available optical power and receiver sensitivity. On the other hand, if optical channels 160 use dispersion shifted fibers, similar benefits can be achieved by shifting the operational wavelength window of laser 110 to around 1550 nm.

Beam splitter 130 splits the input beam from drive laser 110 into separate beams, preferably of about the same intensity. The number N of separate beams from beam splitter 130 may be chosen according to the number of parallel communication channels 160 and may be on the order of eight to sixteen and generally more than two. For this purpose, a high index-contrast waveguide technology may be preferred for splitter 130, so that splitter 130 is compact, allowing integrated circuit 140 to have similar compact dimensions. Suitable single mode 1×N splitters are commercially available from a variety of sources including Hitachi Cable Ltd., Nippon Electric Ltd., or Nomadics, Inc.

Each output beam from beam splitter 130 has a corresponding input waveguide of optical integrated circuit 140 and is directed along the corresponding waveguide and through a corresponding one of the modulators 150 in optical integrated circuit 140. In the illustrated embodiment, splitter 130 and integrated circuit 140 have a direct coupling in which faces of waveguides in splitter 130 abut respective faces of waveguides in integrated circuit 140, and over an operating temperature range, the pitch of the output beams from splitter 130 sufficiently matches the pitch of the beam inputs of integrated circuit 140 to provide a good optical coupling. The size of optical integrated circuit 140 may be limited by any mismatch between the coefficients of thermal expansion of splitter 130 and optical integrated circuit 140. In a typical application where splitter 130 is high refractive index glass and optical integrated circuit 140 is predominantly indium phosphide, splitter 130 and optical integrated circuit 140 can have a contact surface be up to 2 mm and still have less than about 0.25 μm differential expansion over a temperature range of 0° C. to 70° C.

Optical integrated circuit 140 contains passive optical and opto-electronic components such as waveguides and modulators 150. Modulators 150 are preferably Electro-Absorption modulators. In practice, an EA modulator has an absorption edge that moves to longer wavelengths in response to application of a negative voltage bias. For example, if laser 110 has an operating wavelength that is initially about 50 to 70 nm longer than the zero bias absorption edge of an EA modulator, application of a negative bias voltage to the EA modulator reduces optical intensity output from the EA modulator. Low cost and reliable EA modulators that are polarization independent devices can be fabricated using conventional optical integrated circuit processing techniques. U.S. Pat. No. 7,098,471, entitled "Semiconductor Quantum Well Devices and Methods of Making the Same," for example, describes structures and fabrication methods suitable for polarization independent EA modulators 150. Modulators having polarization dependent performance may alternatively be used if polarization preserving fibers and optical circuits are employed to maintain the coupling along the required orientation in the modulator devices of the array. $LiNbO_3$ and other types of modulators, which are known or may be developed, could alternatively be employed.

Optical integrated circuit 140 and more particularly modulators 150 do not require a very high quality AR coating, e.g., a reflectivity of about 1% or less should be more than adequate. Such AR coatings on the facets of the EA modulators 150 are sufficient to prevent formation of a strong resonant optical cavity that could otherwise make the optical signal dependent on the exact physical length as well as the temperature of EA modulators 150. The less expensive AR coating is sufficient because the optical isolator 115 in drive laser 110 can provide the high quality isolation that may be needed for laser 110 to produce the stable optical power and spectrum suitable for high data rate communications.

Each of the modulators 150 can be segmented into two parts of suitable lengths. For example, a shorter front or input section of EA modulators 150 could be used as a variable optical attenuator for purposes of equalizing or leveling the optical power going into each of the EA modulators 150. Simultaneously, each of these short front sections can be used as an optical power monitor. A second longer section of each EA modulator 150 would perform the actual high-speed modulation.

During operation, electrical data signals are fed through the driver circuits (not shown) to respective EA modulators 150 that then convert the electrical data signals into modulation of the respective optical output signals that represent the data streams. The electrical drive circuits are generally high-frequency driving electronics of known or conventional designs and can be fabricated in integrated circuit 140 for operating modulators 150. See, for example, Douglas S. McPherson et al., "A 3-V Fully Differential Distributed Limiting Driver for 40 Gb/s Optical Transmission Systems," IEEE J. of Solid State Circuits, Vol. 38, No 9, pages 1485-1496, September 2003.

Data transmission using an exemplary embodiment of transmitter 100 is generally conducted as follows. A continuous output beam of uniform power from laser 110, e.g., an optically isolated DFB laser, is split into N-channels by 1×N waveguide splitter 130. Optical isolator 115 in drive laser 110 ensures that any optical reflections generated down-line do not feed back into laser 110 to cause any amplitude or spectral instabilities, which can become a problem especially under apparently random bit patterns often encountered in data transmissions. Splitter 130 feeds the N separated beams respectively to N optical waveguides in optical integrated circuit 140, and the N optical waveguides in turn feed light respectively into N modulators 150. Modulators 150 modulate respective optical beams to represent the data being transmitted, before output beams from respective modulators 150 are coupled into respective fibers that may be a part of a ribbon or an array used as the transmission media of optical channels 160.

Figure 2:
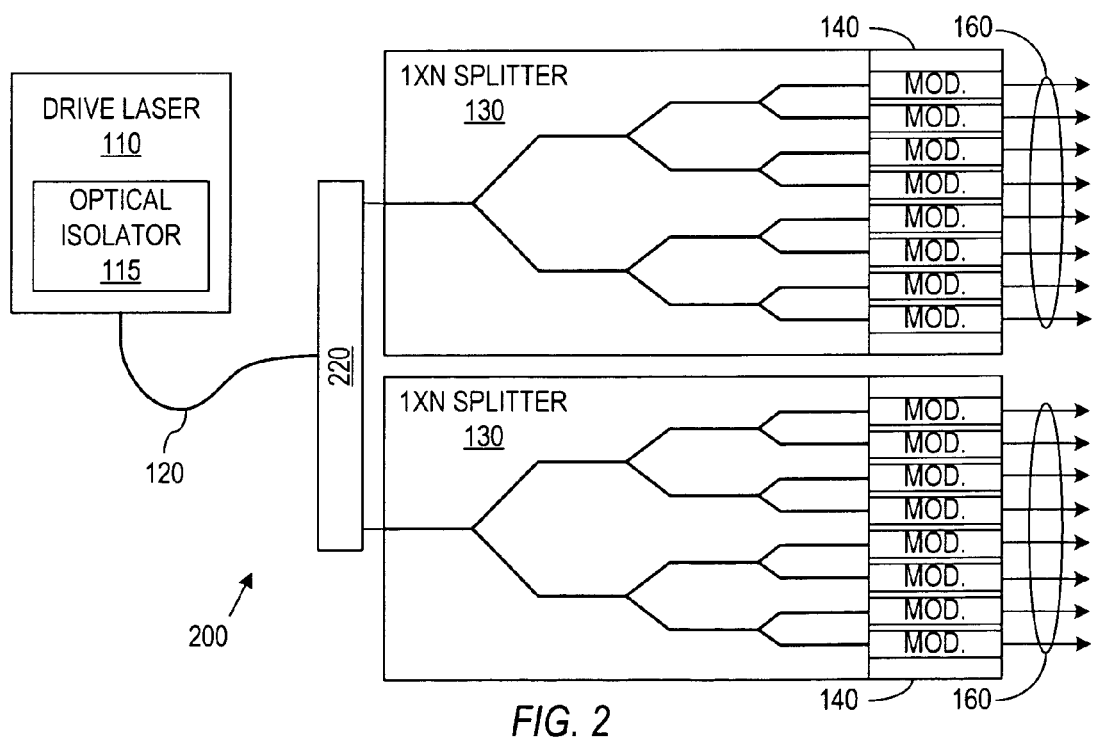
FIG. 2 illustrates a transmitter for optical communications in accordance with an embodiment of the invention using a shared drive laser with multiple splitters and modulator arrays.

The architecture of transmitter 100 provides easy scalability to a larger number of optical channels 160 as the needs of a communication network change. In particular, a single drive laser 110 or a laser subunit containing drive laser 110 can be connected through one or more intermediate beam splitters, e.g., waveguide splitters or fiber splitters, to multiple 1×N splitter-modulator subunits 190. FIG. 2 illustrates an example of a transmitter 200 in which pigtail optical fiber 120 from drive laser 110 is connected to a fiber splitter 220. Fiber splitter 220 in turn feeds input beams to multiple 1×N waveguide splitters 130 and associated optical integrated circuits 140. In FIG. 2, the splitter-modulator subunits containing 1×N splitters 130 and optical integrated circuits 140 can be the same as subunit 190 described above in regard to FIG. 1, and the laser subunit containing drive laser 110 can be the same as subunit 180, except that laser 110 may have to be a higher optical power device to drive more optical channels 160. An advantage of the configuration of transmitter 200 when compared to simply using a larger splitter and a larger modulator array integrated circuit is that smaller devices can provide better optical alignment over a wider temperature range when the coefficients of thermal expansion of splitter 130 and integrated circuit 140 are different, which is generally true for glass waveguides and InP based EA modulators.

Figure 3:
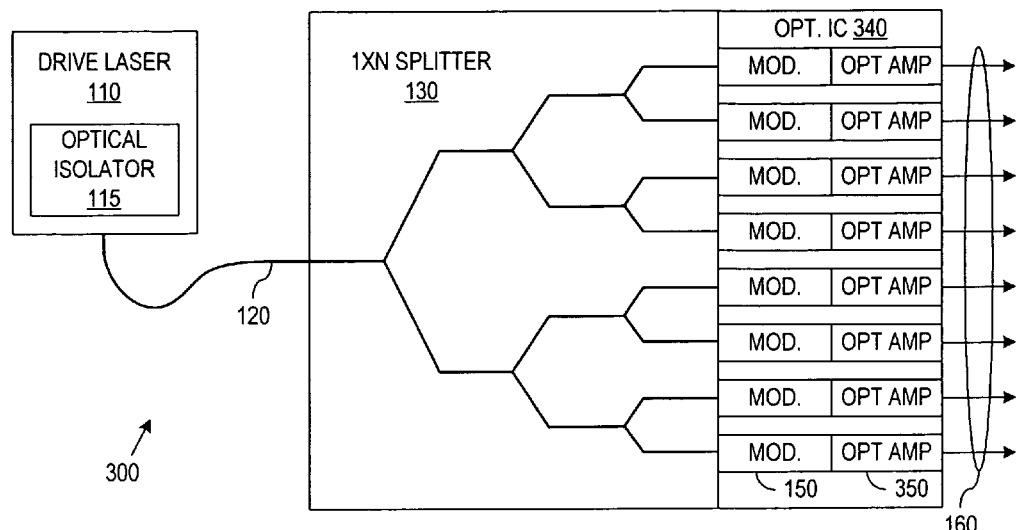
FIG. 3 illustrates a transmitter for optical communications in accordance with an embodiment of the invention using a shared drive laser and an array of optical amplifiers integrated with a modulator array.

FIG. 3 illustrates a transmitter 300 in accordance with an embodiment of the invention that includes EA modulators 150 and optical amplifiers 350 in an array fabricated in an optical integrated circuit 340. Optical amplifiers 350 are included inline, i.e., along the same waveguides as respective EA modulators 150, and can be either before or after the respective modulators 150. One way to fabricate optical amplifiers 350 is to use well-known selective area epitaxy techniques to seamlessly grow active structures that are smoothly connected to EA modulators 150. In general, optical amplifiers 350 can be of the semiconductor variety and have the same kind of active regions as would a laser in the desired wavelength region except that optical amplifiers 350 can be terminated with cleaved facets having AR coatings to eliminate resonant behavior. Even with optical amplifiers 350 included in integrated circuit 340, the complexity of integrated circuit 340 will be less and should have a higher fabrication yield than would an integrated circuit that includes an array of DFB drive lasers since optical amplifiers 350 do not require a frequency selective structure such as an embedded grating. With optical amplifiers 350 in transmitter 300, a lower power drive laser 110 that is optically coupled through 1×N beam splitter 130 to integrated circuit 340 can be employed or equivalently the operating distance range of data transmission can be extended. For increasing the link lengths, with fiber losses of −0.4 db/km, each db in increase of channel power would increase the maximum link length by about 2.5 km. However, the finite chirp associated with EA modulators do not permit link lengths for 40 Gb/s communications to be increased indefinitely just by increasing the available optical power. In the arena of truly long (hundreds of km) distance communication, one needs to worry about dispersion phenomenon such as polarization mode effects at higher data rates (~40 Gb/s). Existing communication systems address these issues, and if parallel channels are needed at these longer link lengths, appropriate steps will need to be taken.

Figure 4:
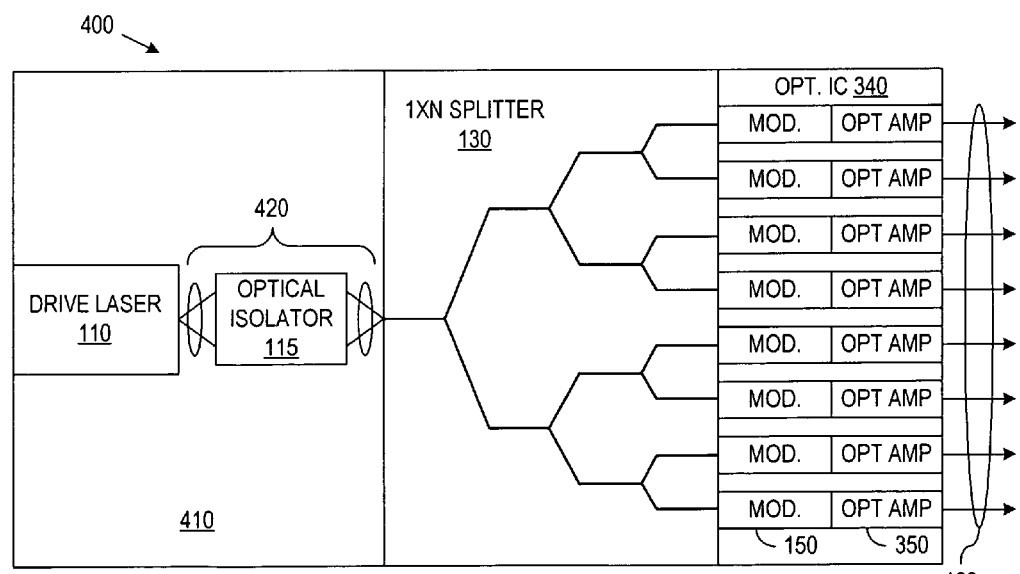
FIG. 4 illustrates a transmitter for optical communications in accordance with an embodiment of the invention where a shared drive laser, a splitter, and an optical modulator array are in a single package.

In accordance with an aspect of the invention noted above, a high bandwidth multi-channel transmitter can include a separate laser subunit that is easily coupled to one or more splitter-modulator units. However, in yet another embodiment of the invention, a single integrated package can include a drive laser with an optical isolator, a 1×N waveguide splitter, and an optical integrated circuit containing N-modulator array with or without inline optical amplifiers. FIG. 4, for example, illustrates a transmitter 400 in which a single package includes a drive laser 110, a 1×N beam splitter 130, and an integrated circuit 340 containing an array of EA modulators 150 and optical amplifiers 350. Drive laser 110, 1×N beam splitter 130, and integrated circuit 340 can be substantially as described above in regard to FIGS. 1 and 3. Transmitter 400 of FIG. 4 additionally incorporates coupling optics 420 between drive laser 110 and 1×N splitter 130. Coupling optics 420 can be polarization preserving for embodiments of the invention where optical integrated circuit 340 contains modulators having polarization dependent performance, but more generally, coupling optics 420 collimate and then focus the output beam from drive laser 110 for efficient coupling into 1×N splitter 130.

A substrate 410, which may include a circuit board, a TE cooler, or other functional elements, serves as a mounting base for drive laser 110 and coupling optics 420 and may additionally provide a base for splitter 130, optical integrated circuit 340, and any modulator drive electronics not incorporated in integrated circuit 340. Substrate 410 can also provide the electrical feed-through and signal and power terminals for both drive laser 110 and integrated circuit 340. In addition, transmitter 400 should include an appropriate optical output, which could be a single mode fiber array in ribbon form or individually terminated. In general, drive laser 110 can be a DFB laser that is mounted on a TE cooler, which maintains a fixed temperature for laser 110 and may form all or part of substrate 110. Such TE coolers are well known in the art of DFB lasers and may be included in transmitter 400 as well as the other transmitters described above.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. An optical transmitter comprising:
  a distributed feedback (DFB) laser;
  a 1×N splitter coupled to split a first beam from the distributed feedback laser into separated beams, 1×N splitter comprises a waveguide beam splitter;
  an array of N modulators coupled to respectively receive the separated beams from the 1×N beam splitter, wherein the modulators modulate the respective beam to represent respective data signals that are transmitted in parallel, the modulators are positioned in an integrated circuit that is separate from the DFB laser and comprises an array of optical amplifiers, each of the optical amplifiers being in line with a corresponding one of the modulators and amplifying the respective modulated beams representing the respective data signals that are transmitted in parallel such that respective amplified modulated beams are output in parallel from the optical transmitter, each modulator comprising an electro-absorption (EA) modulator, each of the optical amplifiers being an active structure having an active region that is connected to the corresponding one of the modulators, the splitter and integrated circuit being joined together by a direct coupling in which faces of waveguides in the splitter abut respective faces of the waveguides in the integrated circuit; and an optical isolator in a beam path from the drive laser to the 1×N splitter, the 1×N splitter and the array of modulators being contained by a first subunit; the distributed feedback laser and the optical isolator being contained by a second subunit which is separate from the first subunit.

2. The transmitter of claim 1, wherein the separated beams from 1×N splitter number more than two beams.

3. The transmitter of claim 1, further comprising:

a second 1×N splitter coupled to split a second beam from the DFB laser into a second set of separated beams;

a second array of N modulators coupled to respectively receive the separated beams of the second set, wherein the modulators in the second array modulate the respective beam in the second set to represent respective data signals that are transmitted in parallel; and a beam splitter that splits a beam from the drive laser to form the first beam and the second beam.

4. The transmitter of claim 1, wherein the first subunit containing the 1×N splitter and the array of modulators have a first optical fiber for input of the first beam; and wherein the second subunit containing the DFB laser have a second optical fiber for optical output from the DFB laser, wherein the second optical fiber is coupled to the first optical fiber.

5. The transmitter of claim 1, further comprising:

a substrate on which the DFB laser is mounted; and coupling optics mounted on the substrate between the DFB laser and the 1×N splitter, wherein the coupling optics directs the first beam into the 1×N splitter.

6. The transmitter of claim 1, further comprising an optical fiber through which the first beam traverses to reach the 1×N splitter.

7. The transmitter of claim 6, wherein the modulators provide polarization independent performance, and the optical fiber comprises a single-mode optical fiber.

8. A data transmission method comprising:

providing a distributed feedback (DFB) laser;

forming a array of electro-absorption (EA) modulators in a integrated circuit which is separate from the (DFB) laser and which comprises an array of optical amplifiers, each of the optical amplifiers being an active structure having an active region that is connected to the corresponding one of the modulators;

positioning each of the optical amplifiers in line with a corresponding one of the EA modulators;

forming a splitter having a plurality of optical waveguides;

joining the splitter and integrated circuit together by a direct coupling in which faces of waveguides in the splitter abut respective faces of waveguides in the integrated circuit;

containing a 1×N splitter and the array of modulators with a first subunit;

positioning an optical isolator in a beam path from the DFB laser to the 1×N splitter;

containing the DFB laser and optical isolator with a second subunit which is separate from the first subunit;

producing a first beam by operating the DFB laser;

directing the first beam into the 1×N splitter that splits the first beam and produces a plurality of separated beams, wherein directing the first beam comprises coupling a first optical fiber of the first subunit that contains the DFB laser that produces the first beam to the second optical unit containing the 1×N splitter; and modulating the separated beams with the EA modulators to represent respective data streams that are transmitted in parallel; and with the array of optical amplifiers, amplifying the respective modulated beams representing the respective data signals that are transmitted in parallel such that respective amplified modulated beams are output in parallel from the optical transmitter.

9. The method of claim 8, wherein the separated beams from the 1×N splitter number more than two beams.

10. The method of claim 8, further comprising providing an optical fiber through which the first beam traverses to reach the 1×N splitter.

11. The transmitter of claim 10, wherein providing an optical fiber through which the first beam traverses comprises providing a single-mode optical fiber, the method further comprising providing polarization independent performance with the modulators.

* * * * *